United States Patent [19]

Bux et al.

[11] Patent Number: 4,539,679
[45] Date of Patent: Sep. 3, 1985

[54] SYNCHRONIZATION IN A COMMUNICATION NETWORK OF INTERCONNECTED RINGS

[75] Inventors: Werner K. Bux, Richterswil, Switzerland; Roy C. Dixon, Cary, N.C.; Ernst H. Rothauser, Reichenburg, Switzerland

[73] Assignee: International Business Machines Corp., Armonk, N.Y.

[21] Appl. No.: 554,646

[22] Filed: Nov. 23, 1983

[30] Foreign Application Priority Data

Nov. 26, 1982 [EP] European Pat. Off. .......... 8211093.1

[51] Int. Cl.³ .............................. H04J 3/02; H04J 3/00
[52] U.S. Cl. ......................................... 370/88; 370/86; 370/85; 370/89; 340/825.5
[58] Field of Search ....................... 370/88, 86, 89, 94; 340/825.05, 825.5

[56] References Cited

U.S. PATENT DOCUMENTS

| | | | |
|---|---|---|---|
| 3,586,782 | 6/1971 | Thomas et al. | 370/88 |
| 3,731,002 | 5/1973 | Pierce | 370/88 |
| 4,287,592 | 9/1981 | Paulish et al. | 370/94 |
| 4,482,999 | 11/1984 | Janson et al. | 370/86 |

Primary Examiner—Douglas W. Olms
Assistant Examiner—Wellington Chin
Attorney, Agent, or Firm—John B. Frisone

[57] ABSTRACT

In a network of communication rings (R1 . . . R7, BB) interconnected by bridges (B1 . . . B4), access to each ring is regulated by a circulating token which is normally issued at irregular intervals depending on occurrence and length of messages. To enable communication of messages which have to be transmitted synchronously, i.e., at regular intervals, each ring has a synchronous bandwidth manager SBM which periodically issues a token for only synchronous information. Each SBM is located in a bridge node (13, 15) but only one of them which is located in a particular bridge node (15) is the master SBM from which all other SBM's are synchronized, using a synchronous token and/or special synchronization circuitry in each bridge. This allows a common period in the whole network for handling synchronous information, even if all rings have different bit rates.

8 Claims, 10 Drawing Figures

$T_S$ = SYNCH TIME INTERVAL (CONST)
$G$ = GAP (VARIABLE, $< D_{max}$)

FIG. 7B

SYNCHRONOUS BANDWIDTH MANAGER

R : TIME UNTIL START OF NEXT SYNCH. INTERVAL

FIG. 9

SYNCHRONIZATION IN A COMMUNICATION NETWORK OF INTERCONNECTED RINGS

The present invention is concerned with synchronization in a communication network consisting of a plurality of transmission rings interconnected by bridges. In particular, it is concerned with the system-wide coordination of the release of synchronous information frames at regular intervals on token-controlled rings which per se are not frame or slot synchronized. Local area networks are an application field for which this technique is of particular interest.

The use of transmission rings for communication networks is well known. They may be either fully slot or frame synchronized so that all fields for information appear in a fixed time raster at regular intervals, or they may use a special access technique such as a token mechanism which allows frames of variable lengths to occur asynchronously, i.e., at irregular intervals.

Systems with rings of the first kind are known, e.g., from U.S. Pat. No. 3,586,782 and from U.S. Pat. No. 3,731,002. Systems with rings of the other kind, i.e., operating asynchronously with tokens, are known from an article by W. Bux et al, "A Local Area Communication Network Based on a Reliable Token-Ring System," published in "Local Computer Networks," North-Holland Publishing Co. 1982, pp. 69–82, and from U.S. Pat. No. 4,482,999.

For larger networks, it may be desirable to interconnect several individual closed rings via connecting units. Such combined networks are also shown in the above-mentioned two U.S. patents and the article by Bux et al.

The asynchronous token rings, though very effective with respect to bandwidth utilization and due to their ability to transport variable-length or irregularly occurring messages, were per se not suited for transporting synchronous information such as digitized voice samples. However, in the above-mentioned U.S. Pat. No. 4,482,999, a technique was disclosed for accommodating synchronous traffic on such rings. In-between asynchronous frames, synchronous tokens or frames are issued at regular intervals for "collecting" all messages that must be synchronously transmitted.

If synchronous messages are to be transmitted across the network between different rings, there are two basic possibilities. The first is to completely synchronize the whole network and provide TDM switches at the ring interconnections, like in a PCM telephone network. This, however, is not desirable for the asynchronous token rings. Another possibility is to provide buffers at the interconnections between rings of different data rates, and extract the data from the buffers under independent control of the individual rings, as described in the above-mentioned patents. This may, however, cause difficulties for the periodic transfer of synchronous information, in particular when asynchronous token rings are interconnected.

It is an object of the present invention to devise a mechanism which enables efficient exchange of messages on a periodic or synchronous basis in a network of interconnected asynchronous token rings.

It is also an object to present a method to synchronize, on a system-wide basis, that portion of the operation of interconnected rings which deals with the transmission of synchronous information, despite the fact that no slot or frame synchronization is provided and each ring may have a different bit rate or clock than the other rings.

It is a further object to achieve the particular synchronization and the efficiency of synchronous-information transmission across rings with a minimum in hardware or protocol effort.

The invention for achieving these objects is presented in claim 1.

The invention permits interconnecting rings of different purpose and design, i.e., rings having completely unrelated bit rates, and nevertheless allow the transportation of information needing regular sampling, e.g., voice, at a rate common to the whole network. No additional interconnections or channels need be provided between the different bridges for the synchronization, as the existing transmission rings and the frames that must anyway be exchanged are sufficient for this purpose according to the inventive method.

SYSTEM OVERVIEW

Figure 1:
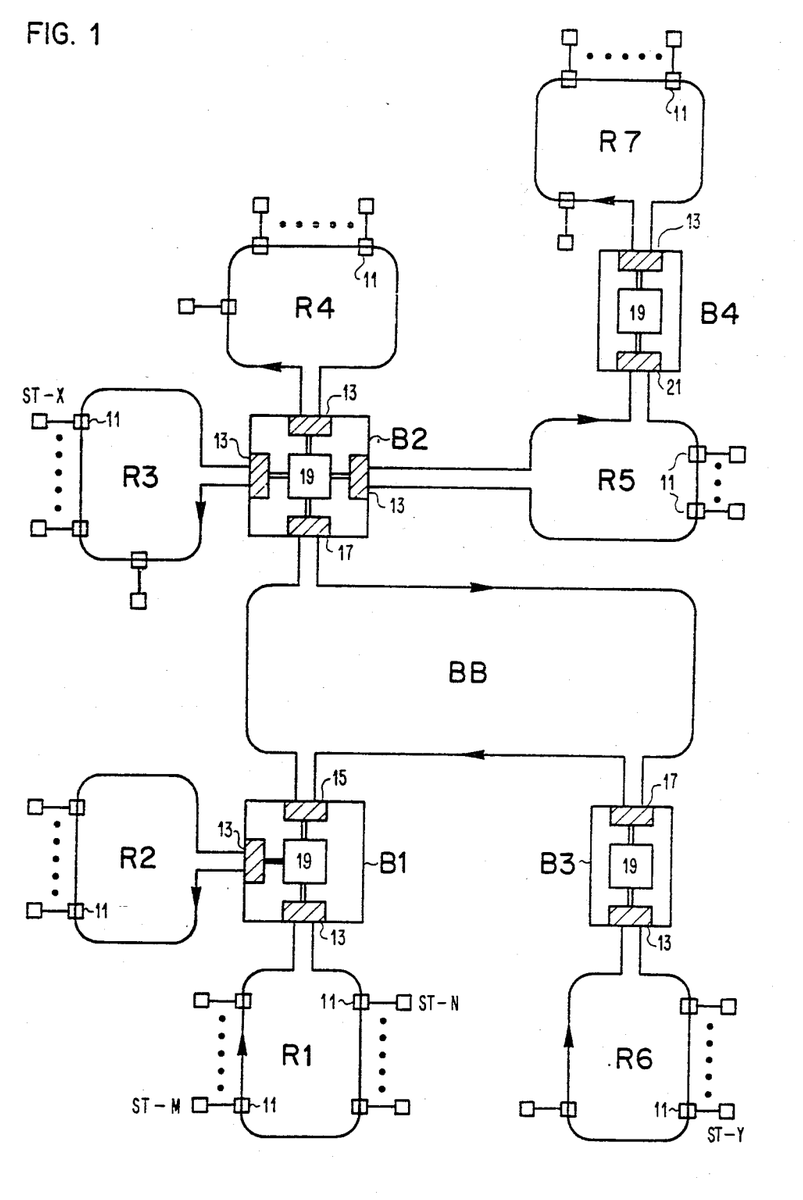
FIG. 1 illustrates in block diagram a network of token rings interconnected by bridges.

A communication network in which the present invention finds application is shown in FIG. 1. It comprises a plurality of transmission rings R1 ... R7 which are interconnected by bridges B1 ... B4. Some of the bridges are directly interconnected by a backbone ring BB. To each ring (except the backbone ring in the present example) several data stations are attached via ring adapters or nodes 11. Only a few of the stations, i.e., ST-N, ST-M, ST-X, and ST-Y are identified in FIG. 1 for later reference.

Messages can be exchanged between rings via the bridges. For this purpose, each ring has a ring adapter or node 13 in the bridge to which it is connected. Backbone ring BB has similar node units 15 and 17 in the bridges it interconnects (node 15 includes a master function to be explained later). Within each bridge, a message transfer unit 19 is provided for the exchange of data between the nodes 13, 15 and 17. Bridge B4 is not connected to backbone ring BB, but rather to a normal ring R5 by another ring adapter or node unit 21.

The configuration shown in FIG. 1 is, of course, only one example. Rings could also be interconnected without a backbone ring, as e.g. in a string configuration (taking only R4-B2-R5-B4-R7) or in a tree configuration (if R3 is added to the string). It is also possible to attach stations directly to backbone ring BB via additional node units.

Communication between stations is effected by frames and access is regulated by a token mechanism. Details of token ring communication were already described in the above mentioned publication by W. Bux et al, and in U.S. patent application Ser. No. 326,291. Therefore, no detailed description of the basic mechanism is necessary here. A few essential points only should be mentioned:

(a) On each ring, one node or station has a monitor function. It maintains the bit clock for the respective ring and monitors the token to avoid situations with lost or duplicated tokens.

(b) On some or all rings, it is possible to transfer, in addition to normal asynchronous messages, synchronously occurring information such as digitized voice samples by a special mechanism disclosed in U.S. patent application Ser. No. 326,291. For this purpose, each ring has a means, called "Synchronous Bandwidth Manager," SBM below, which provide frames for transfer of synchronous information at regular intervals. In the present embodiment, this SBM function is incorporated in bridge node 13 for each normal ring, and in bridge node 15 for backbone ring BB.

It should be noted that rings R1 through R7 may have different, unrelated bit clocks, i.e., each ring can have an individual data transmission speed which differs from the others. It is an essential feature of the present invention that it allows an orderly and efficient exchange of synchronously occurring information between rings via the bridges despite different transmission speeds on the rings.

FRAME FORMAT

Figure 2:
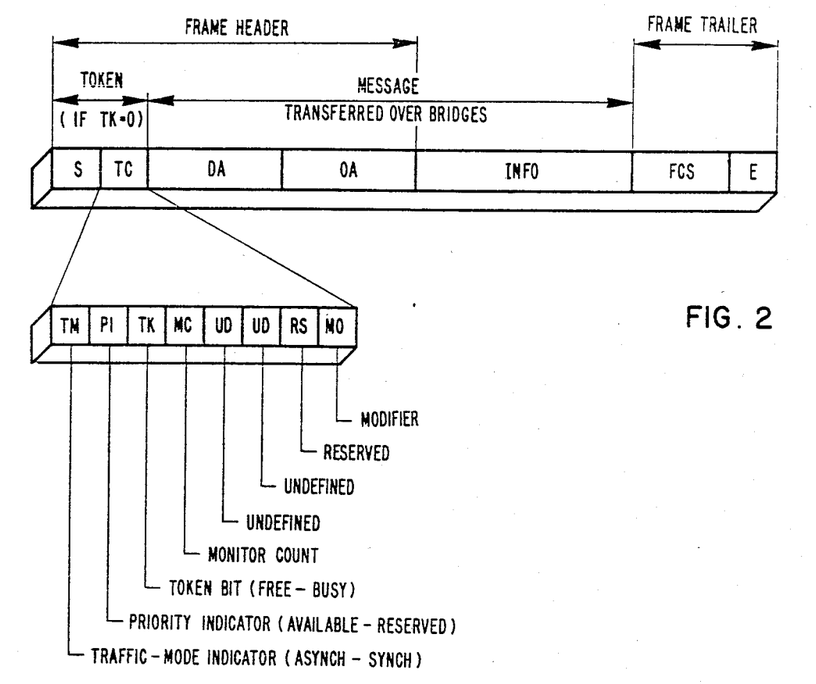
FIG. 2 is an illustration of the frame format used for transporting information in the system of FIG. 1.

The frame format used on the rings, which is known from the above mentioned previous publication, is shown in FIG. 2. It comprises the following essential elements:

The actual message to be transferred between stations, including a destination address DA, an origin address OA, and the transported information INFO in a variable length field.

A frame check sequence FCS.

A transport control field TC comprising eight individual control bits of which three are of particular interest in connection with the present invention:

TK=Token Bit

Indicates whether this is a free/token (TK=0) or not (TK=1).

PI=Priority Indicator

Signifies normal asynchronous transmission mode (PI=0) or a reservation mode (PI=1) in which no new asynchronous token must be issued to allow timely issuance of a token for synchronous information.

TM=Traffic Mode Indicator

Used to distinguish frames and tokens for asynchronous information (TM=0) from those for synchronous information (TM=1).

A start delimiter S and an end delimiter E are added for completing the frame.

As indicated in FIG. 2, the two bytes S (start delimiter) and TC (transport control field) will together be designated as a token (or sometimes as "free token") if the token bit TK=0. Only if a node sees such a free token it can set TK=1 and then append the remainder of a frame containing the information it wants to send. If, however, the token bit TK is already "1" when it is received, the two first bytes S and TC do not represent a token but only the leading portion of a complete frame.

It should be noted that synchronous information can be transported between stations in two different ways:

(a) A single frame for synchronous information is issued by the SBM at regular intervals. It comprises in the INFO field a plurality of consecutive slots each having space for a busy/free indicator, a destination address, and a data byte. Each authorized station can seize and use one slot, and when the synch information frame has circulated twice around the ring, it is discarded.

(b) A first synchronous free token is issued by the SBM at regular intervals. It can be used by one single authorized station which after transmitting its synchronous data issues a new free token for synchronous information. This goes on until all authorized stations have been served once.

Only one of these two different transport mechanisms is used in any system. For the present embodiment, method (b) was chosen, i.e., a sequence of synchronous information frames each used by one station.

It should be further noted that duplex transmission between any pair of stations or nodes is possible with a single frame: e.g., in the network of FIG. 1 a frame may first carry a data item UUU from ST-N to ST-M. The latter extracts UUU from the frame and in its place inserts data item VVV which then travels to station ST-N.

BRIDGES

Important elements in the present multiple ring network are the bridges, and the invention is concerned with synchronization of SBM's to allow effective transfer of synchronous information across these bridges. Therefore, a block diagram of a bridge is shown in FIG. 3 and will now be explained, as well as the mechanism of data transfer between rings.

Figure 3:
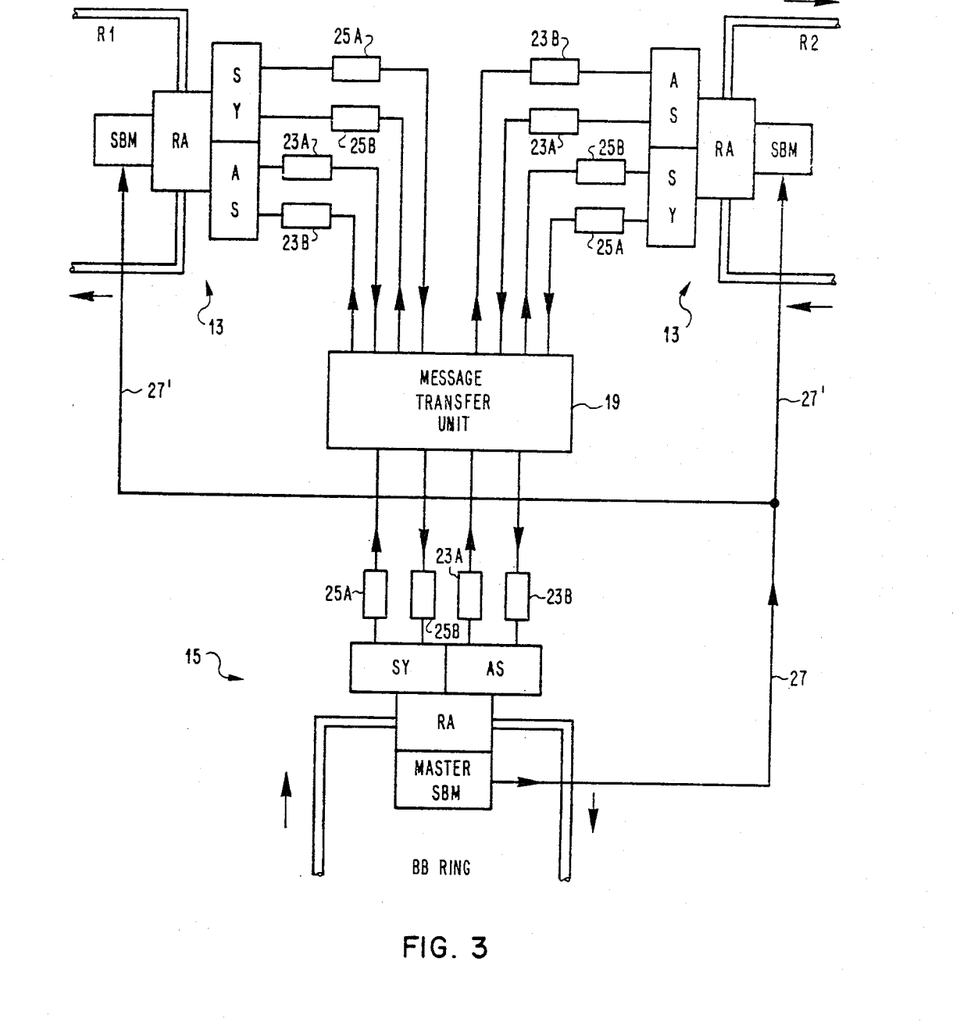
FIG. 3 is a block diagram illustrating the details of one of the bridges shown in FIG. 1.

FIG. 3 shows the relevant details of bridge B1 which interconnects rings R1 and R2 and the backbone ring BB. Bridge nodes 13 and 15 each include a ring adapter RA into which a synchronous bandwidth manager SBM is integrated, and which has inputs/outputs for asynchronous information (AS) and for synchronous information (SY). Each bridge node also includes a set of four FIFO buffers 23A, 23B, 25A, 25B (FIFO=first-in, first-out) for separately storing asynchronous and synchronous data items for incoming and outgoing directions.

Instead of separate FIFO buffers, a common addressable buffer storage could be provided with a suitable addressing and access mechanism which allows the data items or messages to be stored and read separately by direction and information category.

The buffers are all interconnected by a message transfer unit 19. This unit is a TDM switch that can selectively transfer data items from the buffer of one node to the buffer of another node, depending on a destination address associated with the data item and in accordance with a given routing algorithm. Other implementations are possible, e.g., a bus with suitable access control to allow selective transfer of data items between buffers.

As mentioned earlier, bridge node 15 comprises the master SBM for the whole network; the two other bridge nodes 13 comprise normal SBM's. A direct connection 27/27' is provided between the three bridge nodes to enable a transfer of synchronization pulses from the master SBM to the normal SBM's. The other bridges B2, B3, and B4 do not comprise a bridge node with a master SBM, but each has a bridge node 17 or 21 which includes a deputy master or synch extractor from which, via line 27/27' which is provided in each bridge, synch pulses can be transferred to the SBM or SBM's in the other nodes of the respective bridge. The deputy master or synch extractor is not an SBM because each ring can have only one SBM.

Operation of the bridge nodes and the transfer mechanism are as follows:

Each bridge node (13, 15, 17, 21) operates like a normal ring node (11 in FIG. 1) with the difference that instead of a data station that is connected to a normal ring node, a bridge node has the bridge circuitry attached to it which accepts and furnishes data items.

Transfer from ring to bridge: The bridge node watches for frames having a destination address designating a location on another ring to which the respective bridge is the correct path. If it detects such an address, it extracts the actual message, i.e., destination address, origin address, and information field from the frame and inserts it either into buffer 23A or 25A depending on the status of the traffic-mode indicator TM.

Transfer from bridge to ring:

(a) Asynchronous information: The bridge node waits for a free asynchronous token (i.e., with TM=0), and if it detects one, extracts the next message, i.e., DA, OA and INFO field from buffer 23B and transmits a complete frame by adding the appropriate frame check sequence FCS as well as delimiter E.

(b) Synchronous information: The SBM in a bridge node issues a synchronous token (i.e. with TM=1) at regular intervals, basically as described in the above-mentioned U.S. patent application Ser. No. 326,291. The SBM further knows how many synchronous "connections" are existing because it must first authorize each additional connection to limit synchronous traffic to some reasonable fraction of total channel capacity. The bridge node may itself first use the synchronous token for transporting data items (synchronous messages) which are waiting in its buffer 25B. The bridge node then sequentially transmits as many frames as synchronous connections exist between this ring and other rings so that all data items or messages which arrived during the last synchronous period are transmitted on the respective ring at the beginning of the next period. Thereafter, i.e., when no more synchronous messages are to be dispatched from buffer 25B, a synchronous free token will be dispatched so that authorized stations on the ring can send their synchronous messages to other stations on the same ring, or to stations attached to other rings. If all authorized stations were served once, the SBM will recognize this and cause a new asynchronous token to be issued.

The synchronization of synchronous bandwidth managers SBM, and of normal station nodes, under control of the master SBM will be described in a separate section in connection with FIGS. 4, 5, and 6.

Transfer between buffers:

The message transfer unit 19 cyclically scans those of its inputs which are the outputs of buffers 23A holding asynchronous information. It extracts the next message (if there is one) from each buffer just scanned and interrogates the destination address. Under control of a routing algorithm which associates addresses with rings the message is gated into a buffer 23B of either one of the two other bridge nodes. In the same way, the message transfer unit scans all buffers 25A holding synchronous information, and gates each message to a buffer 25B in another bridge node, depending on the destination address. Thus, all buffers are served cyclically, and synchronous information is kept separate from asynchronous information during transfer between buffers within the bridge. The message transfer unit must, of course, operate fast enough to ensure that no synchronous message must wait more than one synchronous period in a buffer.

As an alternative, a single scanning/switching unit can be provided for both, synchronous and asynchronous messages instead of two separate such units. In this case, synchronous traffic buffers must be scanned with highest priority to ensure dispatching of each synchronous message within one period, whereas asynchronous traffic has lower priority.

COMMON TIMING OF SYNCHRONOUS-INFORMATION INTERVALS IN MULTIPLE-RING NETWORK

It is important that the periods for synchronous information, i.e., the intervals between release of synchronous tokens, are the same throughout the network. If these periods were different for different rings, an overflow or underflow of buffers in bridges would occur which would lead to a potential loss of information.

One possibility to achieve uniform intervals would be a complete synchronization of the whole network. This is, however, not desirable. Different data speeds and clock rates must be allowed for different transmission rings to enable integration of various subnetworks in a single network system and to maintain flexibility for future developments.

The invention guarantees uniform periods for transfer of synchronous information despite different individual clock rates on the various rings. How this is achieved will now be explained in connection with FIGS. 4, 5 and 6. Essentially, all synchronous bandwidth managers SBM are synchronized from one master SBM, but the paths for the synchronizing information are different for the various SBM's, depending on their location.

Figure 4:
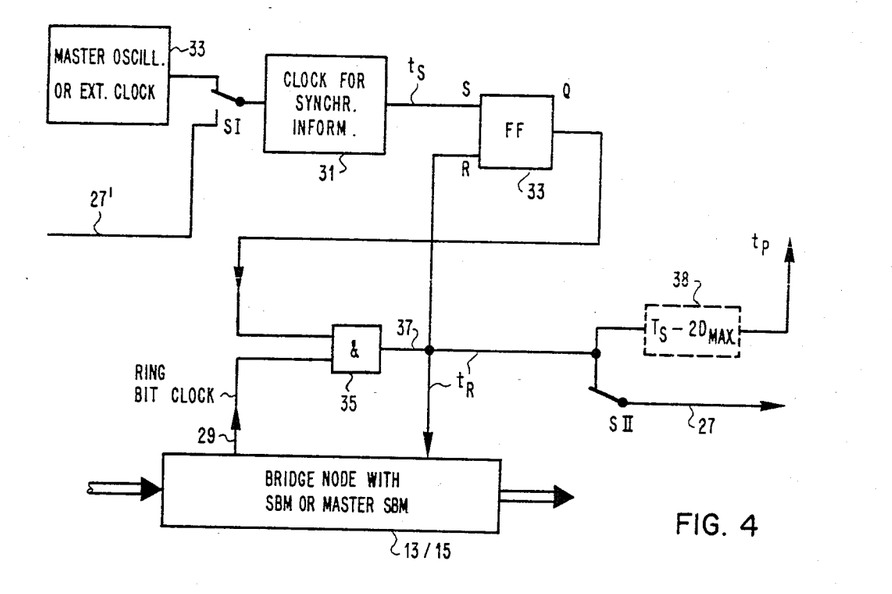
FIG. 4 is a block diagram illustrating circuits utilized to provide synchronization in those bridge nodes having a synchronous bandwidth manager.

FIG. 4 is a simplified block diagram of the bridge nodes including either the master SBM or a normal ring SBM, showing in some detail only the elements for timing the synchronous intervals. The respective bridge nodes carry reference numbers 13 or 15 in FIG. 1. The SBM's in these bridge nodes must release each first synchronous token in proper relationship to both, the local bit clock and the overall system clock for synchronous information. The ring bit clock as derived from data received on the ring is provided on line 29. The clock for synchronous intervals is furnished by clock unit 31. This clock unit is synchronized itself by a very exact master oscillator 33 in the bridge node 15 representing the master SBM. Instead of having its own master oscillator, clock unit 31 in the master SBM may use a very exact external clock source (e.g., the clock of a public network to which the present ring network is connected). In the bridge nodes comprising a normal SBM, clock unit 31 is synchronized by timing pulses on line 27' which are furnished by another bridge node within the same bridge. Switch SI in the position as shown represents the situation in node 15 (master SBM); in its alternate position, it would represent the situation in nodes 13 (normal SBM's).

Each output pulse ($t_S$) from clock unit 31 is used to set a flip-flop 33 indicating start of the next synch period. The setting of flip-flop 33 will condition AND gate 35 which will then gate the next pulse of the ring bit clock to line 37. In each of the nodes 13 and 15, this gated pulse ($t_R$) will be used to control release of the first synchronous token from the respective bridge node to the associated ring. In bridge node 15 (comprising the master SBM), indicated by the closed position of SII, the pulse on line 37 is also furnished via line 27 to the other nodes/SBM's in the same bridge. Token release pulse $t_R$ may be delayed for an interval $T_S - 2 D_{max}$ by unit 38 for obtaining during each period $T_S$ a pulse $t_P$ that leads $t_R$ by two maximum frame durations $2 D_{max}$. This lead interval is used for timely setting priority indicator PI as will be explained in connection with FIG. 7A.

Figure 5:
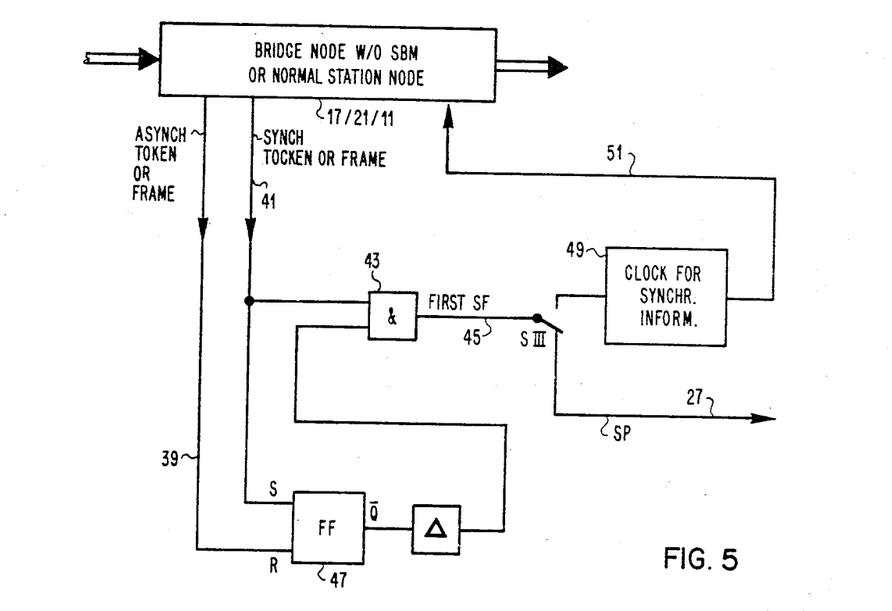
FIG. 5 is a block diagram illustrating circuits utilized to provide synchronization in bridge nodes not having a bandwidth manager, or in nodes for normal stations attached to a ring.

FIG. 5 is a similar simplified block diagram with some detail for timing elements of bridge nodes 17 or 21 which are used as deputy master or synchronization extractor. These nodes recognize when they receive an asynchronous token or frame (TM=0) or a synchronous token or frame (TM=1), and indicate this by a pulse on lines 39 or 41, respectively. The first synchronous token/frame pulse after a series of asynchronous token/frame pulses will be gated by AND gate 43 to line 45, thus indicating the start of a new period for synchronous information. Due to setting of flip-flop 47 by the first synch token/frame pulse, its complement output $\overline{Q}$ will become inactive. And gate 43 is then inhibited after a short delay $\Delta$ and any subsequent synch token/frame pulse will not be gated. The single pulse on line 45 is transferred as synch pulse SP over line 27 to other bridge nodes in the same bridge, for synchronizing their SBM's.

The same mechanism can also be used in those normal station nodes 11 which are allowed to send or receive synchronous information. Switch SIII which in its lower position, as shown in FIG. 5, represents the situation in bridge nodes 17 or 21, would be set to its upper position in a normal station node 11. The pulse on line 45 will then be transferred to clock unit 49 for synchronizing it, and the output of clock 49 is furnished on line 51 to the other circuitry of station node 11. Thus, it needs no expensive exact clock unit, as its clock unit 49 is resynchronized at the beginning of each synchronous-information period, by the first token or frame in which TM=1.

Figure 6:
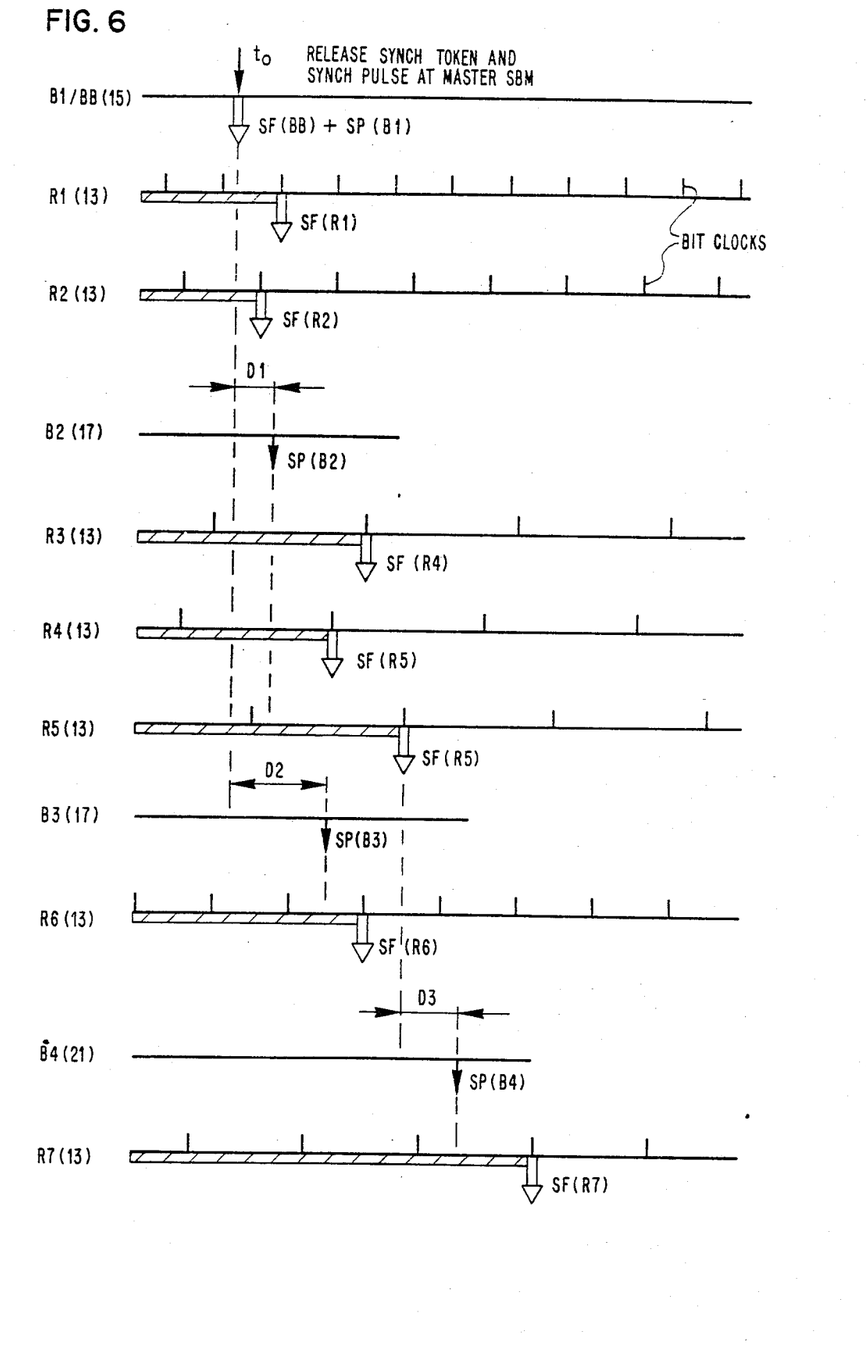
FIG. 6 is a timing diagram showing the relation between synchronous token or frame starts and synchronizing pulses in the different rings and bridges of the system shown in FIG. 1.

A survey of the timing relationship is now given with reference to FIG. 6 and FIG. 1. First in each synchronous information period, at time $t_O$, the master SBM in node 15 of bridge B1 starts the release of a synchronous token or frame SF for ring BB and simultaneously furnishes a synch pulse SP on a line to both other SBM's in bridge B1. Bridge nodes 13 or rings R1 and R2, respectively, receive the synch pulse and release, at their respective next bit clock time (or with a given delay at a later bit clock time) a synchronous token or frame SF to their respective rings R1 and R2.

The synchronous token/frame SF on backbone ring BB propagates meanwhile to bridge B2. Bridge node 17 in B2, when it recognized reception of a first synch token/frame SF, will furnish a synch pulse SP on a line to the three other bridge nodes in B2. The delay D1 between $t_O$ and release of the synch pulse corresponds to the propagation time of token/frame SF from B1 to B2, plus the recognition time for SF in bridge node 17. The three bridge nodes 13 of rings R3, R4, and R5, respectively, receive the synch pulse and release, at their respective next bit clock time (or with a given delay at a later bit clock time) a synchronous token or frame SF to their respective rings. Bridge node 17 in B2 thus acts as a deputy master or synch extractor, i.e., it synchronizes all SBM's in its bridge upon receipt of the first synchronous token or frame SF.

Token or frame SF further propagates to bridge B3 where, in the same way as described above, bridge node 17, upon reception of SF, issues a synch pulse which synchronizes the SBM in bridge node 13 of ring R6 and causes release of a synchronous token or frame SF on ring R6. Delay D2 is the sum of the propagation delay between B1 and B3 plus the recognition time in bridge node 17 of B3.

Though bridge B4 is not directly attached to the backbone ring, synchronization of the SBM in ring R7 is effected in a similar way as for all other SBM's. The synchronous token/frame released from bridge B2 to ring R5 propagates to bridge node 21 in bridge B4. This bridge node will also act as a deputy master or synch extractor, i.e., upon reception and recognition of the first token/frame SF, it furnishes a synch pulse SP on a line to bridge node 13 of ring R7. The latter releases, after receiving this pulse, a synchronous token or frame SF on ring R7 at its next bit clock time (or with a given delay at a later bit clock time). The delay D3 corresponds to the propagation time of a token/frame SF on ring R5 from bridge B2 to bridge B3, plus the recognition time in bridge node 21.

The cross-hatched area under the lines for rings R1 ... R7 in FIG. 6 indicates that, prior to release of each first synchronous token or frame SF, idling patterns are transmitted in the respective rings so that no additional variations can be introduced by the fact that the end of a current asynchronous frame of unknown length has to be awaited. The modified method for this early reservation of each ring will be described in connection with FIGS. 7A/B and 8.

The first synchronous token or frame SF on a ring is recognized by all nodes 11 attached to that ring, and it will synchronize the synchronous-information clock in each such node, as already explained in connection with FIG. 5.

The pattern shown in FIG. 6 is repeated at the beginning of each period for synchronous information. Thus, the synchronous-information clocks of all nodes in the multiple-ring network have all the same period which is determined by one master SBM. There are different phase shifts of the various clocks with respect to the master SBM clock, but these phase shifts remain essentially constant (i.e., the pattern of FIG. 6 does not change). The only variations possible for a given configuration, due to the independency of the system-wide synchronous-information clock period and the ring bit periods of the individual rings, are not greater than one bit period of each respective ring.

RESERVATION OF RING FOR TIMELY RELEASE OF SYNCHRONOUS TOKENS

To enable release of a synchronous token, the SBM in each ring sets the priority indicator PI in the TC field of an asynchronous frame.

In the system disclosed in U.S. patent application Ser. No. 326,291, a synchronous period start signal is issued at regular intervals, and the respective unit (CS monitor) sets the priority indicator (PI bit) in the next frame header it sees after the start signal, and then waits for the end of the current asynchronous frame before it releases a synchronous token. Thus, the start of the first synchronous token in each period varies with respect to the actual synchronous period by less than two maximum frame durations.

To avoid these variations, a modified method is introduced in the present system to allow issuance of synchronous tokens at almost equi-distant time instants. This modified method will be explained in connection with FIGS. 7A, 7B, and 8.

Figure 7A:
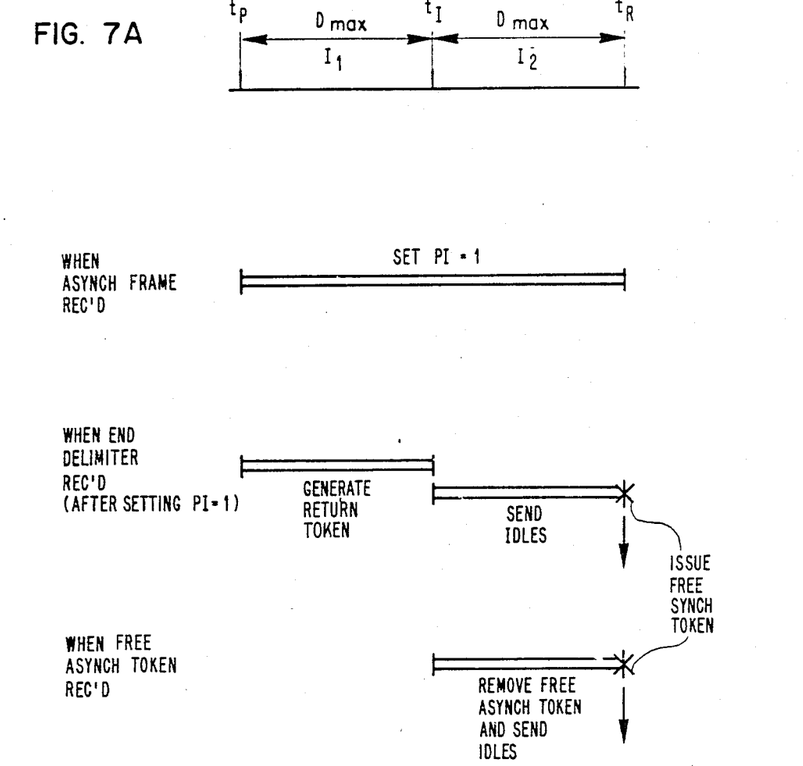
FIG. 7A is a timing diagram of a procedure for ensuring timely reservation of a transmission ring for synchronous information frames.

A watch interval is introduced whose length is equal to two maximum frame durations 2 $D_{max}$. The maximum frame duration is the time between start delimiter and end delimiter of a frame which has an information field INFO of maximum allowed length, e.g., 256 bytes. The watch interval is marked by three time instants (FIG. 7A):

(a) $t_P$ = start time of watch interval for setting priority indicator (b) $t_R$ = release time for synchronous token (c) $T_I$ = intermediate time in the middle between $t_P$ and $t_R$.

These time instants delimit two time intervals $I_1$ and $I_2$ of equal duration $D_{max}$.

If the SBM during intervals $I_1$ and $I_2$ detects an asynchronous frame (TM=0, TK=1), it sets the priority indicator PI in the same frame to "1". If, thereafter, it detects an end delimiter within interval $I_1$, enough time is left for transmitting a complete asynchronous frame. Therefore, the SBM issues a new asynchronous free token (TM=0, TK=0). To avoid usage of this token by an arbitrary station, and for ensuring that only stations downstream of the station which transmitted can seize the token, the SBM may set the priority indicator (PI=1) in the new token thus generating a "return" token, and only the station which had already seen a PI=1 in the returning frame header of its own message, will reset the PI bit in the "return" token (PI=0) to thus allow its usage by a subsequent station.

If the SBM, during interval $I_2$, detects an end delimiter, not enough time is left for another asynchronous frame of maximum duration. Therefore, the SBM sends idle characters during the remainder of $I_2$ until $t_R$, and then promptly issues a synchronous token.

If the SBM detects, during interval $I_2$, an asynchronous free token (TM=0, TK=0), it removes the token and thereafter transmits idle characters until $t_R$. It then promptly issues a synchronous token.

Figure 7B:
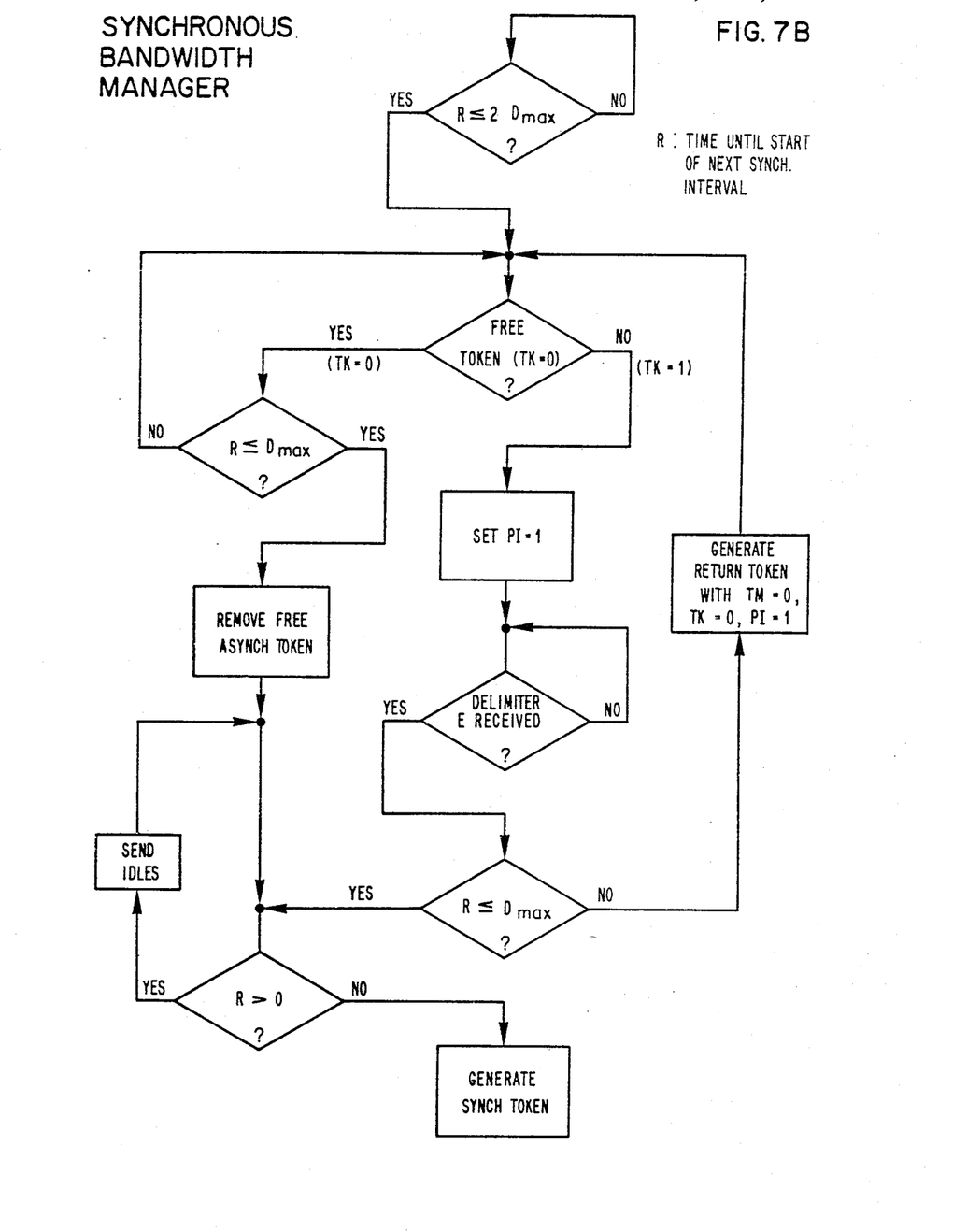
FIG. 7B is a flow diagram of the procedure for ensuring timely reservation of a transmission ring for synchronous information frames.

FIG. 7B shows the respective steps and operations in a flow diagram. In this diagram, R designates the time left until $t_R$.

Figure 8:
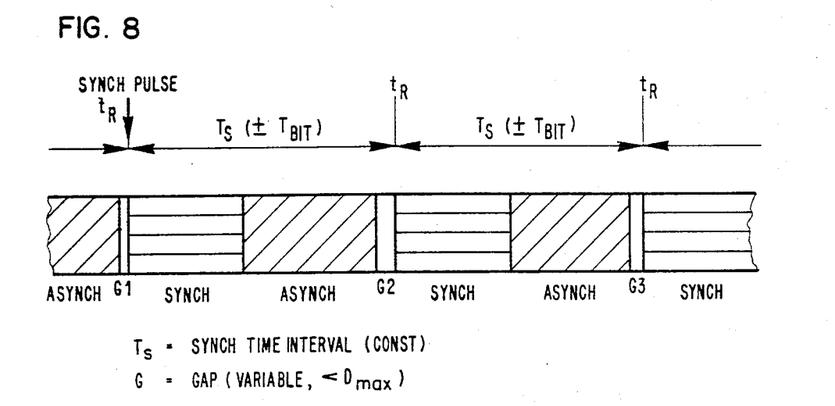
FIG. 8 is a timing diagram of a resulting sequence of synchronous and asynchronous information transmissions in periodic intervals with gaps resulting from early reservations in accordance with the procedure presented in FIGS. 7A and 7B.

A resulting sequence of asynchronous and synchronous transmission intervals on a ring is shown in FIG. 8. The synchronous transmission intervals start at almost equidistant instants $t_R$. $T_S$ is the synchronous information period controlled by the master SBM in the network. Each synchronous transmission interval is immediately followed by an asynchronous transmission interval, but a gap of variable length G1, G2, G3 ... will occur between the end of the asynchronous interval and $t_R$. The gap length depends on the arbitrary start time and length of the last asynchronous frame. These idle gaps are the price to be paid for the exact timing of synchronous tokens.

It should be noted that in the timing of $t_R$ still some micro-variations occur which are at most of a duration of one bit period of the respective ring. This can be seen from the diagram of FIG. 4 where times $t_R$ and $t_P$ have been indicated at the lines where respective pulses occur. For obtaining a pulse for $t_I$, a further delay of duration $D_{max}$ could be provided at the output of delay element 38 in FIG. 4.

DUPLEX TRANSMISSION OF SYNCHRONOUS INFORMATION OVER BRIDGES

For duplex transmission in synchronous frames, the following should be remembered (as disclosed in U.S. patent application Ser. No. 326,291):

To transmit synchronous information, a station has to be authorized, i.e., it must request permission to send from the SBM which grants only as many simultaneous permissions for synchronous information transmission as are tolerable on its ring;

In a synchronous "connection" between two stations, one is the primary station which seizes the synchronous frame or slot and inserts its message, and upon return extracts the message from the other station, whereas the other station is the secondary station which does not seize a frame or slot but only extracts a message addressed to it from a frame/slot and instead inserts its own message for the primary station.

For the presently disclosed multiple-ring network, the following rules were chosen:

(a) For local duplex traffic, i.e., traffic between two stations on the same ring: the calling station is always the primary station, and the called station is the secondary (same rule as already known from single-ring system of U.S. patent application Ser. No. 326,291).

(b) For remote duplex traffic, i.e., traffic between two stations on different rings: The bridge node is always the primary, whereas an actual station, regardless of whether it called or was called, is the secondary. This is necessary because in the bridge node buffers, the messages appear in random sequence and not in the sequence of currently authorized stations around the ring. On the backbone ring, which has to exchange messages between bridge nodes only, no duplex transmission is attempted because of the different random sequences of messages in the buffers involved.

Figure 9:
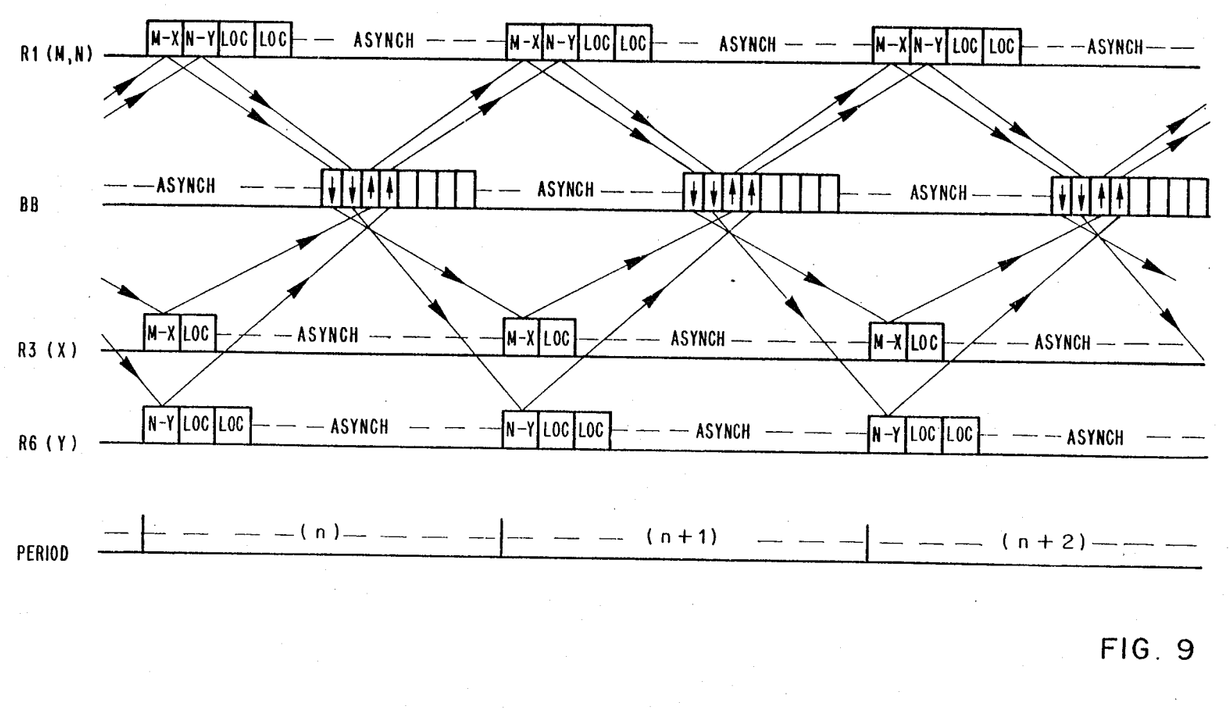
FIG. 9 is a timing diagram showing the exchange of synchronous messages between different rings which have a phase shift in the periodic start of their synchronous frames to allow optimization of the overall transmission delay.

FIG. 9 shows the exchange of synchronous messages between different rings. It is assumed that a first synchronous connection exists between stations ST-M and ST-X (FIG. 1), and a second synchronous connection between stations ST-N and ST-Y. As can be seen, on each ring appear sequences of synchronous frames at regular intervals, and between these sequences room is left for asynchronous transmissions.

The first sequence on ring R1 comprises four frames: M-X for the connection between ST-M and ST-X, N-Y for the connection between ST-N and ST-Y, and two frames LOC for local connections, i.e., between stations on the same ring. Frame M-X first transports a message sent by ST-X from the ring BB to ST-M on R1, then takes the message from ST-M to the ring BB. On the backbone ring, it travels towards ring R3 (first frame with a downward arrow). On ring R3, frame M-X transports first the message sent by ST-M to station ST-X, and then takes the message from ST-X back to ring BB, and so forth.

As can be seen, frames are used in duplex mode on rings R1, R3, R6, etc., whereas on backbone ring BB, each frame transports only one message (simplex mode). This is desirable because of the random sequence of messages in the buffers, as was mentioned earlier. As indicated by the smaller width of the frames on ring BB a faster transmission speed can be provided for the backbone ring to compensate for the simplex mode (greater number of frames) and for the possibly higher volume of traffic with respect to normal rings.

ALTERNATIVES AND MODIFICATIONS

Phase shift between synchronous frames on different rings:

As shown in FIG. 9, the sequences of synchronous frames start simultaneously on rings R1, R3 and R6, but with a phase shift of one-half synchronous period on backbone ring BB. This is an alternative to the solution shown in FIG. 6 where the synch frames start simultaneously (except) for short delays) on all rings.

The alternative solution with phase shifts can be introduced to minimize the total transmission time between source and destination. As shown in FIG. 9, a message which traveled on ring R1 during period n is transported during the same period on backbone ring BB, and it travels already during the next period n+1 on its destination ring R3. If synch frames start simultaneously on all rings, the transmission on backbone BB would require an extra period, i.e., a message traveling on R1 during period n would travel on R3 only during period n+2.

In general, the delay between neighbor rings in a series of interconnected rings, i.e., those interconnected by a bridge, should be one-half synchronous-information period, and the frames for synchronous information should occupy less than half of the total transmission capacity or time (i.e., no overlap of synchronous frames, as shown in FIG. 9). For the network of FIG. 1, the group of rings R1, R2, R3, R4, R5, R6 should start synchronous frames simultaneously, whereas backbone ring BB and ring R7 should start with a phase shift of one-half synchronous period.

Location of master SBM:

In the embodiment described, the master SBM was the SBM of the backbone ring. This will probably ensure the shortest delay for the synchronization information that must be propagated from the master SBM to all other SBM's. However, any one of the SBM's of the normal rings R1 . . . R7 could be chosen to be the master SBM. In a series of interconnected rings without a backbone, which was mentioned earlier as a possible configuration in which the invention can be used, it is anyway necessary that one of the normal ring SBM's is chosen to be the master SBM.

Connection to public network:

One of the rings, e.g., the backbone ring BB, may be connected through a gateway to a public network. A gateway is an interconnection unit similar to a bridge but probably with more general functions. The respective ring will have a gateway node in the gateway, as it has a bridge node in each bridge to which it is attached. If the public network is a fully synchronous network, e.g., a PCM telephone network, the master SBM of the interconnected rings is best located in the gateway node, and it should be synchronized itself from the public network via the gateway. Synchronization within the multiple-ring network is then possible from the master SBM in the same way as was described above.

While the invention has been particularly shown and described with reference to a preferred embodiment thereof, it will be understood by those skilled in the art that numerous changes in form and detail may be made therein without departing from the spirit and scope of the invention.

Having thus described our invention, what we claim as new, and desire to secure by Letters Patent is:

1. A communication network for transporting synchronous data traffic and asynchronous data traffic interspersed therebetween comprising:
   a plurality of token access rings in which synchronous traffic is inititated by an authorized synchronous station connected thereto upon receipt of a free synchronous token frame and in which asynchronous traffic is initiated by an asynchronous station upon receipt of a free asynchronous token frame;
   a bridge for interconnecting said rings,
      said bridge including at least one synchronous bandwidth manager means (SBM) for each ring connected thereto,
      one only of said SBM means being configured as a master synchronous bandwidth manager (MSBM),
      said one MSBM periodically generating and transmitting a unique control signal over a separate conductor to all SBM means;
   each of said SBM means receiving a said unique control signal generating and transmitting over its connected ring a free synchronous token frame; and
   each of said SBM means including said one MSBM means generating and transmitting a free asynchronous token frame upon the completion of a synchronous transmission cycle.

2. A communication network for transporting synchronous data traffic and asynchronous data traffic interspersed therebetween comprising:
   a plurality of token access rings in which synchronous traffic is initiated by an authorized synchronous station connected thereto upon receipt of a free synchronous token frame and in which asynchronous traffic is initiated by an asynchronous station upon receipt of a free asynchronous token frame;
   at least one bridge for interconnecting said rings,
      said bridge including at least one synchronous bandwidth manager means (SBM) for each ring connected thereto,
      a master synchronous bandwidth manager (MSBM) connected to one of said rings,
      said one MSBM periodically generating and transmitting a free synchronous token frame on the ring connected thereto;
   each of said SBM means receiving a free synchronous token frame generated by any other synchronous bandwidth manager means generating and transmitting a unique control signal via separate conductor to all SBM means connected to the same bridge as the receiving SBM means; and
   each of said SBM means including said one MSBM means generating and transmitting a free asynchronous token frame upon the completion of a synchronous transmission cycle.

3. A communication network for transporting synchronous data traffic and asynchronous data traffic interspersed therebetween comprising:
a plurality of token access rings in which synchronous traffic is initiated by an authorized synchronous station connected thereto upon receipt of a free synchronous token frame and in which asynchronous traffic is initiated by an asynchronous station upon receipt of a free asynchronous token frame;
at least one bridge for interconnecting said rings,
said at least one bridge including at least one synchronous bandwidth manager means (SBM) for each ring connected thereto,
one only of said SBM means being configured as a master synchronous bandwidth manager (MSBM),
said one MSBM periodically generating and transmitting a free synchronous token frame on the ring connected thereto and a unique control signal over a separate conductor to all SBM means connected to the same bridge as the MSBM means;
each of said SBM means receiving a said unique control signal generating and transmitting over its connected ring a free synchronous token frame;
each of said SBM means receiving a free synchronous token frame generated by any other synchronous bandwidth manager means generating and transmitting a said unique control signal via separate conductor to all SBM means connected to the same bridge as the receiving SBM means; and
each of said SBM means including said one MSBM means generating and transmitting a free asynchronous token frame upon the completion of a synchronous transmission cycle.

4. A communication network for transporting synchronous data traffic and asynchronous data traffic interspersed therebetween comprising:
a plurality of token access rings in which synchronous traffic is initiated by an authorized synchronous station connected thereto upon receipt of a free synchronous token frame and in which asynchronous traffic is initiated by an asynchronous station upon receipt of a free asynchronous token frame;
at least one bridge for interconnecting said rings,
said at least one bridge including at least one synchronous bandwidth manager means (SBM) for each ring connected thereto,
one only of said SBM means being configured as a master synchronous bandwidth manager (MSBM),
said one MSBM periodically generating and transmitting a free synchronous token frame on the ring connected thereto, if so connected, and a unique control signal over a separate conductor to all SBM means, if any, connected to the same bridge as the MSBM means;
each of said SBM means receiving a said unique control signal generating and transmitting over its connected ring a free synchronous token frame;
each of said SBM means, if any, receiving a free synchronous token frame generated by any other synchronous bandwidth manager means generating and transmitting a said unique control signal via separate conductor to all SBM means, if any, connected to the same bridge as the receiving SBM means; and
each of said SBM means including said one MSBM means generating and transmitting a free asynchronous token frame upon the completion of a synchronous transmission cycle.

5. In a communication network having a plurality of transmission rings interconnected by a bridge, in which network access on each ring is regulated by a token mechanism, each ring including a synchronous bandwidth manager (SBM) only one of which is designated a master (MSBM), each of said SBM's including said MSBM issues at periodic intervals a free priority token frame for the transmission of synchronous traffic by authorized stations, and each of said rings operates at independently selected bit rates and phase, a method of synchronizing the transmission of synchronous traffic comprising the steps of:
transmitting periodically from said MSBM a timing control signal to all of the SBM's;
at each SBM transmitting a free priority token frame on its connected ring in response to said timing control signal; and
at each of said SBM's including said MSBM transmitting a free non-priority token frame upon the completion of a cycle of synchronous operation.

6. In a communication network having a plurality of transmission rings interconnected by at least one bridge, in which network access on each ring is regulated by a token mechanism, each ring including a synchronous bandwidth manager (SBM) only one of which is designated a master (MSBM), each of said SBM's including said MSBM issues at periodic intervals a free priority token frame for the transmission of synchronous traffic by authorized stations, and each of said rings operates at independently selected bit rates and phase, a method of synchronizing the transmission of synchronous traffic comprising the steps of:
transmitting periodically from said MSBM a free priority token frame over the ring to which it is connected;
at each SBM which receives a free priority token frame from another SBM transmitting a timing control signal to all of the SBM's connected to the bridge to which the receiving SBM is connected;
at each SBM receiving a said timing control signal transmitting a free priority token frame on its connected ring; and
at each of said SBM's including said MSBM transmitting a free non-priority token frame upon the completion of a cycle of synchronous operation.

7. In a communication network having a plurality of transmission rings interconnected by at least one bridge, in which network access on each ring is regulated by a token mechanism, each ring including a synchronous bandwidth manager (SBM) only one of which is designated a master (MSBM), each of said SBM's including said MSBM issues at periodic intervals a free priority token frame for the transmission of synchronous traffic by authorized stations, and each of said rings operates at independently selected bit rates and phase, a method of synchronizing the transmission of synchronous traffic comprising the steps of:
transmitting periodically from said MSBM a free priority token frame over the ring to which it is connected and substantially simultaneously therewith a timing control signal to all of the SBM's connected to the bridge to which the MSBM is connected;
at each SBM which receives a free priority token frame from another SBM including said MSBM transmitting a said timing control signal to all of the SBM's connected to the bridge to which the receiving SBM is connected;

at each SBM receiving a said timing control signal transmitting a free priority token frame on its connected ring; and at each of said SBM's including said MSBM transmitting a free non-priority token frame upon the completion of a cycle of synchronous operation.

8. In a communication network having a plurality of transmission rings interconnected by at least one bridge, in which network access on each ring is regulated by a token mechanism, each ring including a synchronous bandwidth manager (SBM) only one of which is designated a master (MSBM), each of said SBM's including said MSBM issues at periodic intervals a free priority token frame for the transmission of synchronous traffic by authorized stations, and each of said rings operates at independently selected bit rates and phase, a method of synchronizing the transmission of synchronous traffic comprising the steps of:

transmitting periodically from said MSBM a free priority token frame over the ring to which it is connected and substantially simultaneously therewith a timing control signal to all of the SBM's, if any, connected to the bridge to which the MSBM is connected;

at each SBM which receives a free priority token frame from another SBM including said MSBM transmitting a said timing control signal to all of the SBM's, if any, connected to the bridge to which the receiving SBM is connected;

at each SBM receiving a said timing control signal transmitting a free priority token frame on its connected ring; and at each of said SBM's including said MSBM transmitting a free non-priority token frame upon the completion of a cycle of synchronous operation.

* * * * *